United States Patent
Oe et al.

(10) Patent No.: US 7,677,083 B2
(45) Date of Patent: Mar. 16, 2010

(54) INTERNAL COMBUSTION ENGINE KNOCK DETERMINATION DEVICE

(75) Inventors: Shuhei Oe, Kariya (JP); Kiyoshi Iwade, Okazaki (JP); Kouji Ohara, Nukata-gun (JP); Rihito Kaneko, Nishikamo-gun (JP); Kenji Kasashima, Nishikamo-gun (JP); Yuichi Takemura, Anjo (JP); Shigeru Kamio, Nagoya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 90 days.

(21) Appl. No.: 11/410,037

(22) Filed: Apr. 25, 2006

(65) Prior Publication Data

US 2006/0236754 A1    Oct. 26, 2006

(30) Foreign Application Priority Data

Apr. 26, 2005   (JP)   ............................. 2005-128114

(51) Int. Cl.
*G01L 23/22*   (2006.01)
(52) U.S. Cl. .................................................. 73/35.09
(58) Field of Classification Search ................ 73/35.09; 701/111
See application file for complete search history.

(56) References Cited

U.S. PATENT DOCUMENTS

| | | | | |
|---|---|---|---|---|
| 4,444,042 A | * | 4/1984 | Bonitz et al. ................ | 73/35.03 |
| 4,478,068 A | * | 10/1984 | Bonitz et al. ................ | 73/35.04 |
| 4,565,087 A | * | 1/1986 | Damson et al. ............. | 73/35.04 |
| 5,230,316 A | * | 7/1993 | Ichihara et al. ........ | 123/406.38 |
| 5,343,843 A | | 9/1994 | Hamren | |
| 5,537,855 A | | 7/1996 | Hunninghaus et al. | |
| 6,546,328 B1 | * | 4/2003 | Slicker ....................... | 701/111 |
| 2004/0162668 A1 | * | 8/2004 | Rawlinson et al. .......... | 701/111 |
| 2005/0000272 A1 | | 1/2005 | Takemura et al. | |

FOREIGN PATENT DOCUMENTS

| | | |
|---|---|---|
| DE | 102 15 959 A1 | 10/2003 |
| DE | 103 43 146 A1 | 4/2005 |
| EP | 0 454 486 A2 | 10/1991 |
| EP | 0 732 573 A2 | 9/1996 |
| EP | 0 889 309 A1 | 1/1999 |
| EP | 1 221 603 A1 | 7/2002 |
| JP | 2001-227400 | 8/2001 |
| JP | 2003-21032 | 1/2003 |
| JP | 2004-353531 | 12/2004 |
| JP | 2005-23902 | 1/2005 |

* cited by examiner

*Primary Examiner*—Hezron Williams
*Assistant Examiner*—Mark Shabman
(74) *Attorney, Agent, or Firm*—Oblon, Spivak, McClelland, Maier & Neustadt, L.L.P.

(57) ABSTRACT

An engine ECU executes a program including the steps of: setting a knock waveform model corresponding to engine speed sensed by a crank position sensor; calculating knock intensity N based on the result of comparison between a detected waveform and the set knock waveform model; when the knock intensity N is larger than a predetermined reference value, determining that knocking has occurred; and when the knock intensity N is not larger than the predetermined reference value, determining that knocking has not occurred.

12 Claims, 7 Drawing Sheets

F I G. 1
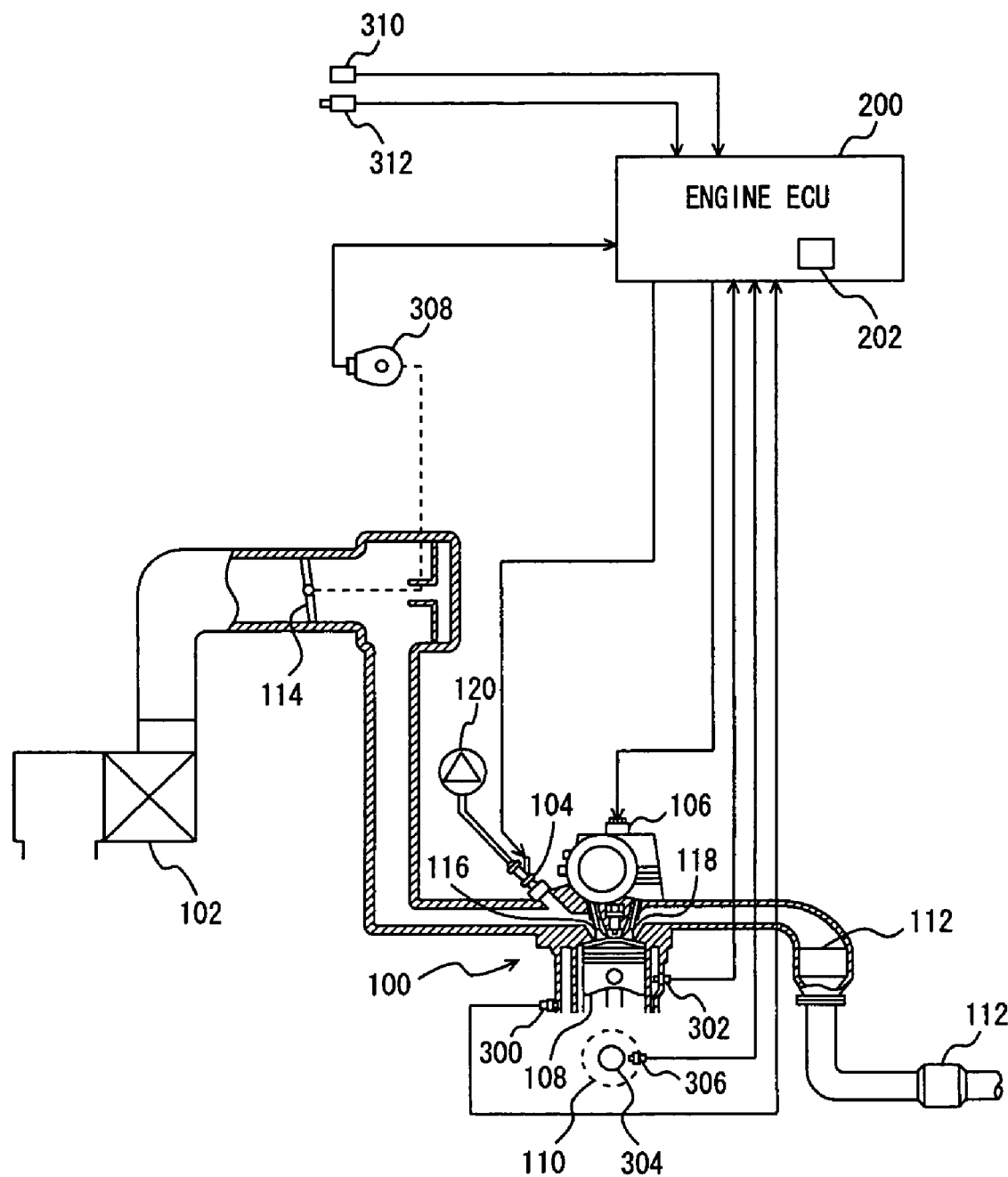

F I G. 2
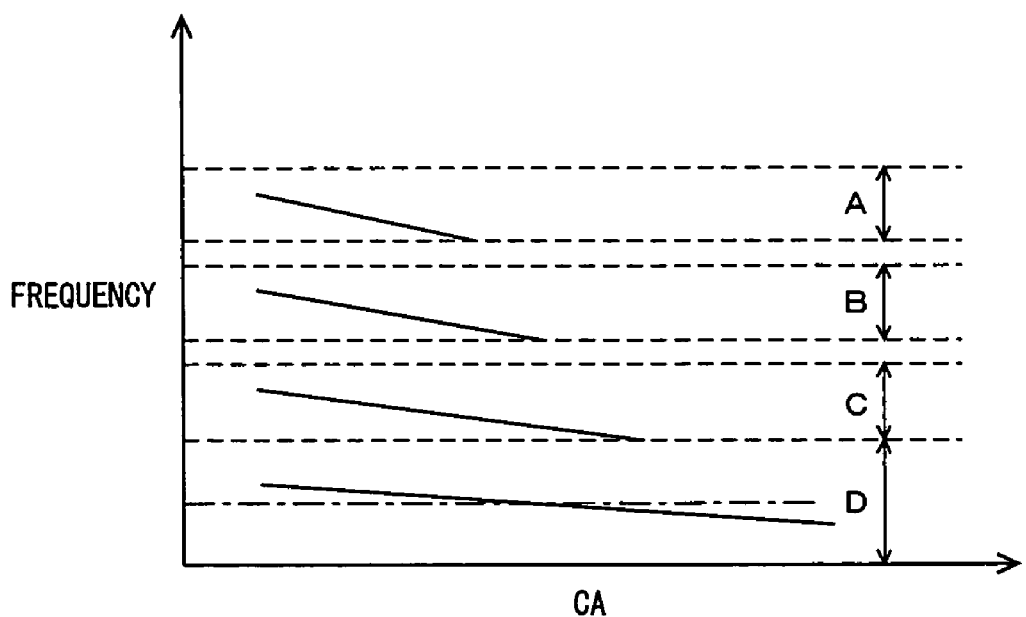
F I G. 3
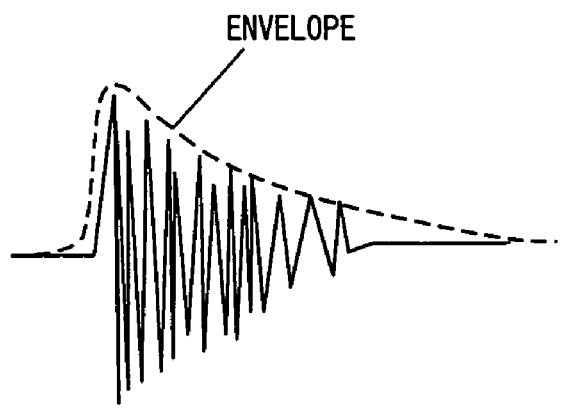
F I G. 4
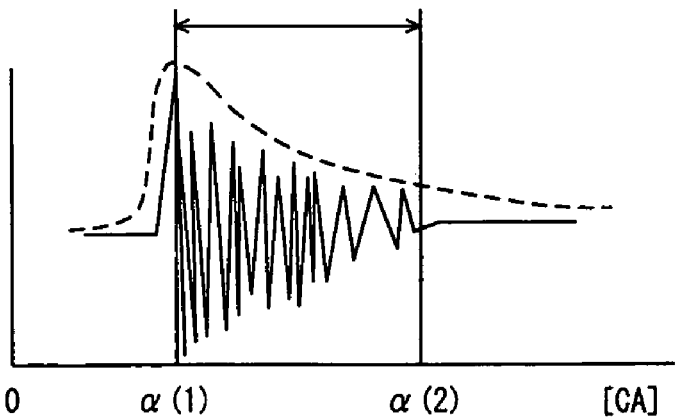

FIG. 10A
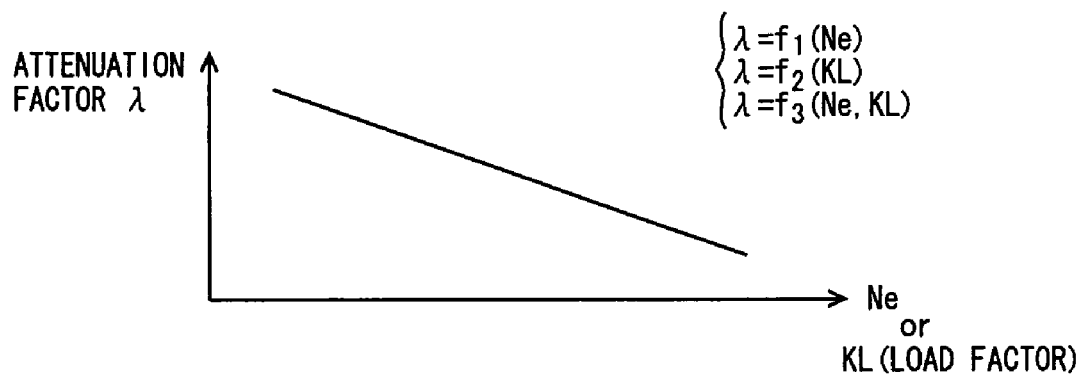
FIG. 10B
FIG. 11
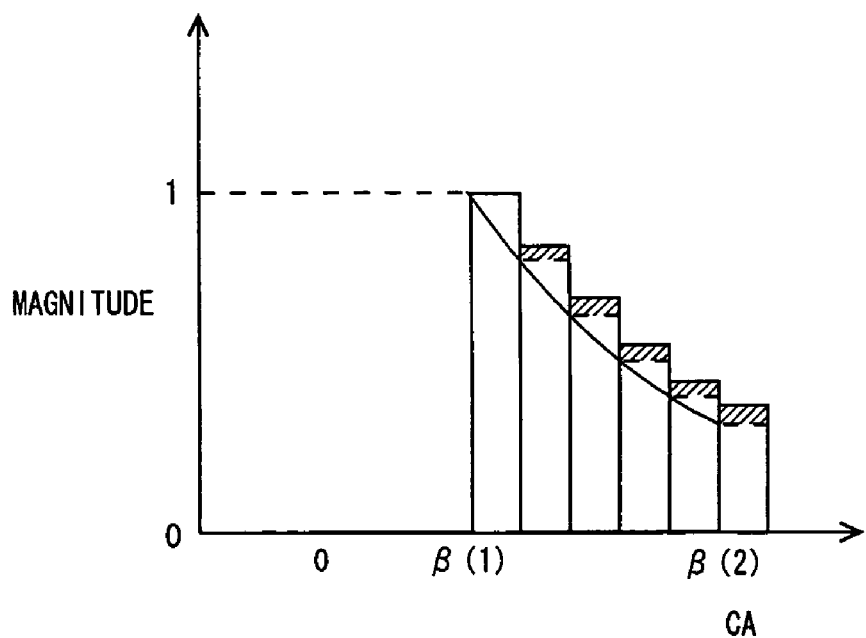

INTERNAL COMBUSTION ENGINE KNOCK DETERMINATION DEVICE

This nonprovisional application is based on Japanese Patent Application No. 2005-128114 filed with the Japan Patent Office on Apr. 26, 2005, the entire contents of which are hereby incorporated by reference.

BACKGROUND OF THE INVENTION

1. Field of the Invention

The present invention relates to a knocking determination device and, more specifically, to a knocking determination device for an internal combustion engine that determines whether knocking occurs or not, based on vibration waveform of the internal combustion engine.

2. Description of the Background Art

Conventionally, a technique for detecting knocking of an internal combustion engine is known. Japanese Patent Laying-Open No. 2001-227400 discloses a knock control device for an internal combustion engine that can accurately determine whether the engine knocks. The knock control device for an internal combustion engine includes a signal detector detecting a signal representing a waveform of vibration occurring in the internal combustion engine (or a vibration waveform signal), an occurrence period detector detecting a period as an occurrence period during which the vibration waveform signal detected by the signal detector assumes a predetermined value or higher, a peak position detector detecting a peak position in the occurrence period detected by the occurrence period detector, a knock determiner determining whether the internal combustion engine knocks based on the relation between the occurrence period and the peak position, and a knock controller controlling an operation state of the internal combustion engine in accordance with a determination result of the knock determiner. The knock determiner determines knock (knocking) occurs when the peak position relative to the occurrence period is in a predetermined range.

According to the knock control device for an internal combustion engine disclosed in the publication, a signal representing a waveform of vibration occurring in the internal combustion engine is detected by a signal detector. An occurrence period during which the vibration waveform signal assumes a predetermined value or higher and a peak position therein are detected by an occurrence period detector and a peak position detector, respectively. Thus, the knock determiner can determine whether the engine knocks by detecting the position of the peak in the occurrence period of the vibration waveform signal. According to the knock determination result, the operation state of the internal combustion engine is controlled. When the peak position relative to the occurrence period is in a predetermined range, that is, when a waveform has such a shape that the peak position appears earlier relative to a predetermined length of the occurrence period of the vibration waveform signal, the knock determiner recognizes it as being particular to knocking. Thus, even in a transition state where an operation state of the internal combustion engine abruptly changes or when electric loads are turned on/off, whether or not the internal combustion engine knocks is accurately determined, and the operation state of the internal combustion engine can be controlled appropriately.

However, while the engine knocks, a vibration that is greater in magnitude than a vibration attributed to knocking may sometimes be detected as noise. That is, in some cases a vibration attributed to a fault of a knock sensor or attributed to a vibration of the internal combustion engine itself may be greater in magnitude than a vibration attributed to knocking. In such cases, with the knock control device for an internal combustion engine of Japanese Patent Laying-Open No. 2001-227400, there has been a problem that the engine is erroneously determined as not knocking while the engine actually knocks, based on the fact that the peak position relative to the occurrence period is not within a predetermined range.

SUMMARY OF THE INVENTION

An object of the present invention is to provide a knock determination device that can determine whether the engine knocks with high accuracy.

According to an aspect, the present invention provides a knocking determination device for determining knocking of an internal combustion engine. The knocking determination device includes: a crank angle detecting unit detecting a crank angle of the internal combustion engine; a waveform detecting unit detecting a vibration waveform of the internal combustion engine between predetermined crank angles; a storage unit storing in advance one waveform representing vibration waveform corresponding to knocking that does not change regardless of type and state of operation of the internal combustion engine; and a determining unit determining whether knocking occurred in the internal combustion engine or not, based on a result of comparison between the detected waveform and the waveform stored in the storage unit.

According to the present invention, the crank angle detecting unit detects the crank angle of the internal combustion engine, and the waveform detecting unit detects the waveform of vibration of the internal combustion engine between predetermined crank angles. The storage unit stores in advance one waveform of vibration corresponding to knocking, which does not change regardless of the type and state of operation of the internal combustion engine. Based on the result of comparison between the detected waveform and the stored waveform, whether the internal combustion engine knocks or not is determined. Accordingly, if it is possible, for example, to specify a vibration waveform corresponding to one knocking that does not change dependent on the type and state of operation of the internal combustion engine, a knock waveform model as the vibration waveform that appears when knocking occurs may be formed and stored in advance, and by comparing the knock waveform model and the detected waveform, whether knocking occurred or not can be determined. Further, the knock waveform model is one waveform that does not change dependent on the type and state of operation of the internal combustion engine. Therefore it becomes unnecessary to store a plurality of knock waveform models for different types and different states of operation of the internal combustion engine, and thus, the amount of data to be stored beforehand can be reduced. Further, it is unnecessary to set a plurality of knock waveform models for different types of internal combustion engine, and hence, the time necessary for setting can be made shorter. Therefore, a knocking determination device that can accurately determine whether the knocking occurs or not in the internal combustion engine while enabling reduction in data amount to be stored beforehand can be provided.

According to another aspect, the present invention provides a knocking determination device for determining knocking of an internal combustion engine. The knocking determination device includes: a crank angle detecting unit detecting a crank angle of the internal combustion engine; a waveform detecting unit detecting a vibration waveform of the internal combustion engine between predetermined crank angles; a storage unit storing in advance a plurality of vibration waveforms of the internal combustion engine corresponding to states of operation of the internal combustion engine; and a determining unit determining whether knocking occurred in the internal combustion engine or not, based on a result of comparison between the detected waveform and a waveform corresponding to the state of operation of the internal combustion engine among the plurality of waveforms stored in the storage unit.

According to the present invention, the crank angle detecting unit detects the crank angle of the internal combustion engine, and the waveform detecting unit detects the waveform of vibration of the internal combustion engine between predetermined crank angles. The storage unit stores a plurality of vibration waveforms of the internal combustion engine that correspond to states of operation (such as the number of rotation of crank shaft) of the internal combustion engine. Based on the result of comparison between the detected waveform and the stored waveform, whether the internal combustion engine knocks or not is determined. Specifically, a plurality of knock waveform models representing vibration waveforms when knocking occurs, which correspond to the states of operations, are prepared through an experiment or the like and stored in advance. By comparing the detected waveform with one of the stored plurality of knock waveform models, which corresponds to the state of operation, whether knocking occurred or not can be determined. Vibration corresponding to knocking may have different tendency dependent on the state of operation of the internal combustion engine that varies with time. Therefore, by storing a plurality of knock waveform models corresponding to the states of operation of internal combustion engine, it becomes possible to provide a knocking determination device that can accurately determine whether the knocking occurs or not in the internal combustion engine.

Preferably, the knocking determination device further includes a rotation number sensing unit sensing the number of rotation of an output shaft of the internal combustion engine. The storage unit stores in advance a plurality of vibration waveforms corresponding to the number of rotation. The determining unit determines whether knocking occurred in the internal combustion engine or not, based on a result of comparison between the detected waveform and a waveform stored in the storage unit corresponding to the sensed number of rotation.

According to the present invention, the storage unit stores a plurality of vibration waveforms corresponding to the number of rotation of the output shaft of the internal combustion engine (crank shaft of the engine) obtained, by way of example, through an experiment. By comparing the detected waveform and the waveform that corresponds to the sensed number of rotation among the stored plurality of waveforms, it is possible to determine whether the knocking occurs or not in the internal combustion engine with high accuracy.

More preferably, the knocking determination device further includes a load factor sensing unit sensing a load factor of the internal combustion engine. The storage unit stores in advance a plurality of vibration waveforms corresponding to the load factor. The determining unit determines whether knocking occurred in the internal combustion engine or not, based on a result of comparison between the detected waveform and the waveform stored in the storage unit corresponding to the sensed load factor.

According to the present invention, the storage unit stores a plurality of vibration waveforms corresponding to the load factors of the internal combustion engine obtained, by way of example, through an experiment. By comparing the detected waveform and the waveform that corresponds to the sensed load factor among the stored plurality of waveforms, it is possible to determine whether the knocking occurs or not in the internal combustion engine with high accuracy.

More preferably, the knocking determination device further includes a rotation number sensing unit sensing the number of rotation of an output shaft of the internal combustion engine and a load factor sensing unit sensing a load factor of the internal combustion engine. The storage unit stores in advance a plurality of vibration waveforms corresponding to the number of rotation and the load factor. The determining unit determines whether knocking occurred in the internal combustion engine or not, based on a result of comparison between the detected waveform and the waveform stored in the storage unit corresponding to the sensed number of rotation and the sensed load factor.

According to the present invention, the storage unit stores a plurality of vibration waveforms corresponding to the number of rotation of the output shaft of the internal combustion engine (crank shaft of the engine) and to the load factors, obtained, by way of example, through an experiment. By comparing the detected waveform and the waveform that corresponds to the sensed number of rotation and load factor among the stored plurality of waveforms, it is possible to determine whether the knocking occurs or not in the internal combustion engine with high accuracy.

More preferably, the waveform stored in the storage unit is a waveform of a section between a first angle and a second angle. The first and second angles are both larger than, or both smaller than an angle that corresponds to a peak value of vibration waveform.

According to the present invention, as the first and second angles are both larger or both smaller than the angle that corresponds to the peak value of vibration waveform, either the rising portion or attenuating portion of the vibration waveform can be used as the knock waveform model. Therefore, by comparing the knock waveform model with the waveform of either the rising portion or attenuating portion of the detected waveform, the shape of waveform particular to knocking can be determined with high accuracy. Further, only the characteristic portion of vibration corresponding to knocking is stored, and therefore, the mount of data to be stored beforehand can be reduced.

More preferably, the waveform stored in the storage unit is a waveform of a section between a first angle and a second angle. The section includes an angle that corresponds to a peak value of vibration waveform.

According to the present invention, the storage unit stores the waveform of a section between the first angle that corresponds to the peak value of vibration waveform and the second angle, and therefore, a waveform covering at least one of the rising portion and attenuating portion of the vibration waveform including the peak value can be used as the knock waveform model. Therefore, by comparing the knock waveform model with the waveform of the corresponding section, the shape of waveform particular to knocking can be determined with high accuracy, as the waveform of the portion including the peak value has high signal output. Further, only the characteristic portion of vibration corresponding to knocking is stored, and therefore, the amount of data to be stored beforehand can be reduced.

More preferably, the first angle is an angle corresponding to the peak value of vibration waveform.

According to the present invention, the first angle corresponds to the peak value of the vibration waveform. Specifically, the waveform covering at least one of the rising portion and attenuating portion of the vibration waveform including the peak value can be used as the knock waveform model.

Therefore, by comparing the knock waveform model with the waveform of the corresponding section, the shape of waveform particular to knocking can be determined with high accuracy, as the waveform of the portion including the peak value has high signal output.

More preferably, the second angle is an angle advance by a predetermined angle from the first angle.

According to the present invention, the second angle is an angle advanced by a predetermined angle from the first angle that corresponds to the peak value of the vibration waveform. Specifically, by storing the waveform of the section from the first angle corresponding to the peak value of the vibration waveform to the second angle, the attenuating portion of the vibration waveform including the peak value can be used as the knock waveform model. Therefore, by comparing the knock waveform model with the detected waveform of the attenuating portion including the peak value, the shape of waveform particular to knocking can be determined with high accuracy, as the waveform of the portion including the peak value has high signal output.

According to another aspect, the present invention provides a knocking determination device for determining knocking of an internal combustion engine. The knocking determination device includes: a crank angle detecting unit detecting a crank angle of the internal combustion engine; a waveform detecting unit detecting a vibration waveform of the internal combustion engine between predetermined crank angles; a storage unit storing in advance an envelope of amplitude of vibration waveform corresponding to knocking; and a determining unit determining whether knocking occurred in the internal combustion engine or not, based on a result of comparison between the detected waveform and the stored envelope.

According to the present invention, the crank angle detecting unit detects the crank angle of the internal combustion engine, and the waveform detecting unit detects the waveform of vibration of the internal combustion engine between predetermined crank angles. The storage unit stores in advance an envelope of amplitude of a vibration waveform that corresponds to knocking. Based on the result of comparison between the detected waveform and the stored envelope, whether the internal combustion engine knocks or not is determined. Specifically, a knock waveform model is prepared based on the envelope of amplitude of the vibration waveform when knocking occurs, through an experiment or the like, and stored in advance. By comparing the detected waveform with the stored envelope, whether knocking occurred or not can be determined. Therefore, whether or not the engine knocks can be determined based not only on the magnitude of vibration of the internal combustion engine but also on the crank angle at which vibration occurs. Further, the envelope of amplitude after the peak value of vibration waveform has a vibration attenuation curve particular to knocking. Therefore, it becomes possible to provide a knocking determination device that can accurately determine whether the knocking occurs or not in the internal combustion engine, by comparing the detected waveform with the knock waveform model.

According to another aspect, the present invention provides a knocking determination device for determining knocking of an internal combustion engine. The knocking determination device includes: a crank angle detecting unit detecting a crank angle of the internal combustion engine; a waveform detecting unit detecting a vibration waveform of the internal combustion engine between predetermined crank angles; a storage unit storing in advance a predetermined attenuation factor after an angle corresponding to the peak value of vibration waveform of the internal combustion engine; and a determining unit determining whether knocking occurred in the internal combustion engine or not, based on a result of comparison between the detected waveform and a waveform derived from the stored attenuation factor.

According to the present invention, the crank angle detecting unit detects the crank angle of the internal combustion engine, and the waveform detecting unit detects the waveform of vibration of the internal combustion engine between predetermined crank angles. The storage unit stores in advance a predetermined attenuation factor after the angle that corresponds to the peak value of vibration waveform of the internal combustion engine. Based on the result of comparison between the detected waveform and the waveform derived from the stored attenuation factor, whether the internal combustion engine knocks or not is determined. Specifically, the attenuation factor after the angle that corresponds to the peak value of vibration waveform when knocking occurs is stored in advance through an experiment or the like, and by comparing the detected waveform with the waveform derived from the stored attenuation factor, whether knocking occurred or not can be determined. Therefore, whether or not the engine knocks can be determined based not only on the magnitude of vibration of the internal combustion engine but also on the crank angle at which vibration occurs. Further, from the predetermined attenuation factor, the attenuating waveform after the peak value of vibration corresponding to knocking can be calculated by approximation, and therefore, the amount of data to be stored beforehand can be reduced. Alternatively, by storing a plurality of attenuation factors, it becomes possible to provide a knocking determination device that can accurately determine whether the knocking occurs or not in the internal combustion engine, by comparing the detected waveform with the waveform derived from the attenuation factor that corresponds to the state of operation of the internal combustion engine.

Preferably, the waveform stored in the storage unit is a waveform of a section between a first angle and a second angle. The first angle is an angle corresponding to the peak value of vibration waveform.

According to the present invention, as the storage unit stores the waveform of the section between the first angle corresponding to the peak value of vibration waveform and the second angle, the attenuating portion of the vibration waveform including the peak value can be used as the knock waveform model. Therefore, by comparing the knock waveform model with the waveform of the attenuating portion including the peak value of the detected waveform, the shape of waveform particular to knocking can be determined with high accuracy, as the waveform of the portion including the peak value has high signal output. Further, only the characteristic portion of vibration corresponding to knocking is stored, and therefore, the amount of data to be stored beforehand can be reduced.

More preferably, the second angle is an angle advance by a predetermined angle from the first angle.

According to the present invention, the second angle is an angle advanced by a predetermined angle from the first angle that corresponds to the peak value of the vibration waveform. Specifically, by storing the waveform of the section from the first angle corresponding to the peak value of the vibration waveform to the second angle, the attenuating portion of the vibration waveform including the peak value can be used as the knock waveform model. Therefore, by comparing the knock waveform model with the detected waveform of the attenuating portion including the peak value, the shape of waveform particular to knocking can be determined with high accuracy, as the waveform of the portion including the peak value has high signal output.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic configuration diagram showing an engine controlled by a knock determination device according to an embodiment of the present invention.

FIG. 2 is a diagram representing frequencies of vibrations occurring in the engine.

FIG. 3 represents knock waveform model (1).

FIG. 4 represents a section that defines the knock waveform model.

FIGS. 10A and 10B represent relation between engine speed and attenuation factor.

FIG. 11 is a diagram representing timings for comparing the normalized vibration waveform with the knock waveform model.

DESCRIPTION OF THE PREFERRED EMBODIMENTS

Figure 5:
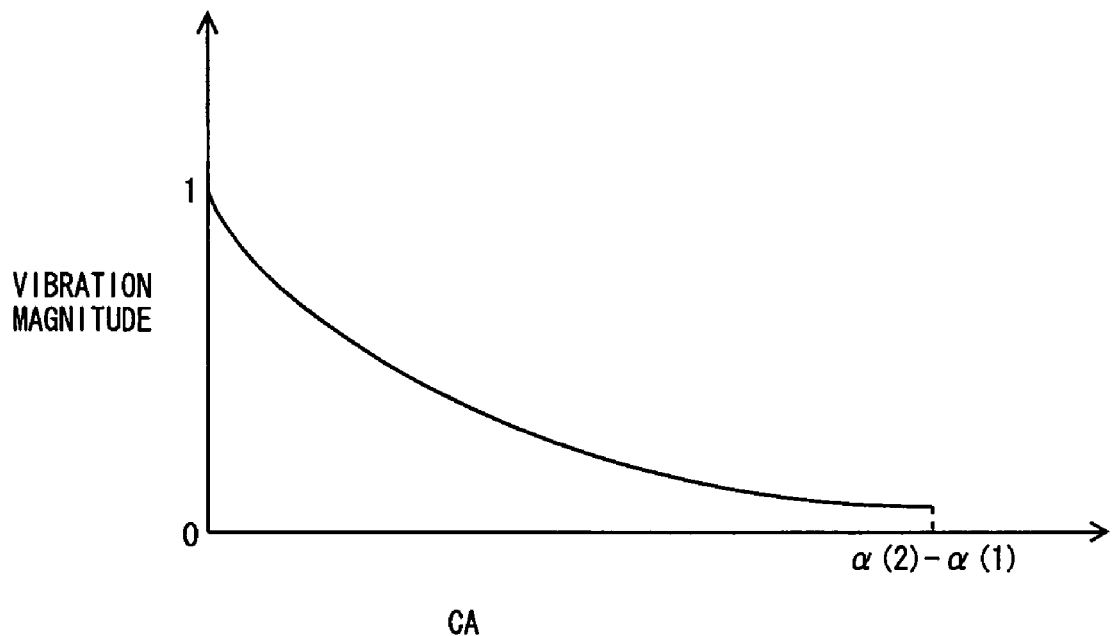
FIG. 5 represents knock waveform model (2).

Embodiments of the present invention will be described in the following with reference to the figures. In the following description, the same components are denoted by the same reference characters. The names and functions are also the same. Therefore, detailed description thereof will not be repeated.

With reference to FIG. 1, an engine 100 of a vehicle incorporating a knock determination device according to an embodiment of the present invention will be described. The knock determination device of the present embodiment is implemented by a program executed, for example, by an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber.

The burning of air-fuel mixture causes combustion pressure that presses a piston 108 down, whereby a crank shaft 110 rotates. The combusted air-fuel mixture (or exhaust gas) is purified by a three-way catalyst 112 and thereafter discharged outside the vehicle. The amount of air taken into engine 110 is adjusted by a throttle valve 114.

Engine 100 is controlled by engine ECU 200 having connected thereto a knock sensor 300, a water temperature sensor 302, a crank position sensor 306 arranged opposite a timing rotor 304, a throttle opening sensor 308, a vehicle speed sensor 310, and an ignition switch 312.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of cooling water in engine 100 at a water jacket and transmits a signal representing a resultant detection to engine ECU 200.

Timing rotor 304 is provided at a crank shaft 110 and rotates as crank shaft 110 does. Timing rotor 304 is circumferentially provided with a plurality of protrusions spaced by a predetermined distance. Crank position sensor 306 is arranged opposite the protrusions of timing rotor 304. When timing rotor 304 rotates, an air gap between the protrusions of timing rotor 304 and crank position sensor 306 varies, so that magnetic flux passing through a coil portion of crank position sensor increases/decreases, thus generating electromotive force. Crank position sensor 306 transmits a signal representing the electromotive force to engine ECU 200. From the signal transmitted from crank position sensor 306, engine ECU 200 detects a crank angle and the number of rotation of crank shaft 110.

Throttle opening sensor 308 detects a throttle open position and transmits a signal representing a resultant detection to engine ECU 200. Vehicle speed sensor 310 detects number of rotation of a wheel (not shown) and transmits a signal representing a resultant detection to engine ECU 200. From the number of rotation of the wheel, engine ECU 200 calculates the vehicle speed. Ignition switch 312 is turned on by a driver, for starting engine 100.

Engine ECU 200 uses the signals transmitted from each sensor and ignition switch 312 as well as a map and program stored in a memory 202 to perform an operation to control equipment so that engine 100 attains a desired driving condition.

In the present embodiment, using a signal transmitted from knock sensor 300 and a crank angle, engine ECU 200 detects a waveform of a vibration of engine 100 at a predetermined knock detection gate (a section from a predetermined first crank angle to a predetermined second crank angle) (hereinafter such waveform of a vibration will also simply be referred to as "vibration waveform") and from the detected vibration waveform determines whether engine 100 knocks. The knock detection gate of the present embodiment is from the top dead center (0°) to 90° in a combustion stroke. It is noted that the knock detection gate is not limited thereto.

When the engine knocks, vibrations occur in engine 100 at frequencies around the frequencies represented by solid lines in FIG. 2. That is, when engine 100 knocks, the vibrations at frequencies included in a first frequency band A, a second frequency band B, a third frequency band C, and a fourth frequency band D occur. In FIG. 2, CA represents a crank angle. The number of frequency bands including the frequencies of a vibration attributed to knocking is not limited to four.

Of these frequency bands, fourth frequency band D includes a resonance frequency of engine 100 itself that is represented by an alternate-short-and-long dashed line in FIG. 2. Vibration of resonance frequency generates regardless of presence/absence of knocking.

Therefore, in the present embodiment, a vibration waveform is detected based on the magnitudes of the vibrations of first to third frequency bands A to C not including the resonance frequency. The number of frequency bands used in detecting the vibration waveform is not limited to three. It is noted that in an engine less susceptible to resonance of the engine itself or the influence of mechanical noise, it may be unnecessary to select the frequency band. As to the method of extracting frequency band, any known method may be adopted. The detected vibration waveform is compared with a knock waveform model, which will be described later.

In order to determine whether a knock occurred or not, a memory 202 of engine ECU 200 stores a knock waveform model, which is a model vibration waveform when engine 100 knocks, as shown by a dotted line in FIG. 3.

In the knock waveform model, magnitude of vibration is represented by a dimensionless number of 0 to 1 and does not uniquely correspond to a crank angle. More specifically, for the knock waveform model of the present embodiment, while it is determined that the vibration decreases in magnitude as the crank angle increases after the peak value in magnitude of vibration, the crank angle at which the vibration magnitude assumes the peak value is not determined. In the present embodiment, the knock waveform model is stored in memory 202 with the crank angle at which the vibration magnitude peaks being set to zero.

The knock waveform model is an envelope of amplitude (vibration magnitude) of the synthesized wave (solid line) of the first to third frequency bands A to C. The method of calculating the envelope is not specifically limited and it may be calculated by any known technique. By way of example, it may be calculated by integrating the amplitude at every predetermined angle, or it may be calculated using root mean square (RMS) or Hilbert envelope. In the present embodiment, the envelope is calculated by integrating the amplitude of each of the first to third frequency bands A to C of the waveform obtained through an experiment or the like at every five degrees (5°), and by synthesizing the integrated values for the first to third frequency bands.

In the present embodiment, referring to FIG. 4, of the waveform obtained through an experiment, for example, the waveform of a section (dotted line) from an angle α (1) that corresponds to the peak value of vibration magnitude generated by knocking to an angle α (2) advanced by a predetermined angle therefrom is set as the knock waveform model. The knock waveform model is not limited to this section. For instance, the angles α (1) and α (2) may be both larger than or smaller than the angle that corresponds to the peak value of vibration waveform, and the waveform covering either the rising portion or attenuating portion of the vibration caused by knocking may be set as the knock waveform model. Alternatively, the waveform covering at least one of the rising portion and the attenuating portion of the vibration caused by knocking may be set as the knock waveform model.

The knock waveform model is obtained as follows: an experiment or the like is conducted to force knocking of engine 100, and the vibration waveform of engine 100 is detected, from which the knock waveform model is created and stored in advance.

It is noted that the knock waveform model is not specifically limited to the envelope of amplitude of the synthesized wave of the first to third frequency bands A to C of the detected vibration corresponding to knocking, such as described above. For instance, the knock waveform model may be calculated by an equation that specifies an approximate waveform of an attenuating portion of the vibration corresponding to knocking, based on a predetermined attenuation factor. Specifically, referring to FIG. 5, the attenuation waveform of vibration corresponding to knocking can be represented in approximation by an equation of exponential function: (vibration magnitude)=exp(−λ×crank angle), where λ represents attenuation factor (logarithmic decrement). Therefore, only the attenuation factor λ and the equation above have to be stored in advance in memory 202. In this manner also, the knock waveform model that corresponds to the waveform of the section from the angle α (1) that corresponds to the peak value of vibration to the angle α (2) advanced by a predetermined angle therefrom shown in FIG. 4 may be formed. The knock waveform model may be formed by different methods.

Engine ECU 200 compares the detected waveform with the stored knock waveform model, and determines whether engine 100 knocks or not.

Figure 6:
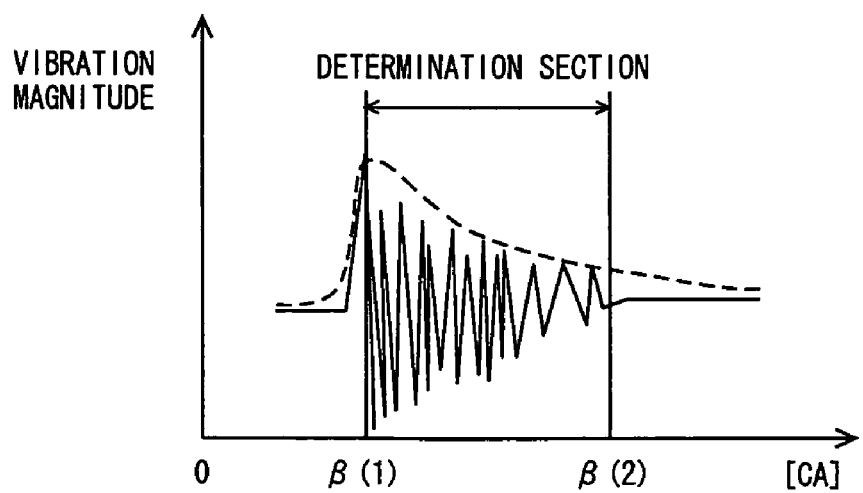
FIG. 6 represents a vibration waveform sensed by the knock sensor.

In the present embodiment, the section from the angle β (1) that corresponds to the peak value of waveform detected by knock sensor 300 to the angle β (2) advanced by a predetermined angle therefrom shown in FIG. 6 is used as the section for determining the knock waveform model. The determination section is defined to be within the knock detection gate and correspond to the set section of the knock determination model described above.

Engine ECU 200 calculates the envelope (dotted line) of the amplitude of synthesized wave (solid line) of the first to third frequencies of the waveform detected by knock sensor 300. The method of calculating the envelope is the same as that for the knock waveform model, and therefore, detailed description thereof will not be repeated.

The present invention is characterized in that engine ECU 200 determines whether knocking occurred in engine 100 or not based on a result of comparison between the knock waveform model stored in memory 202 and the detected waveform.

Figure 7A:
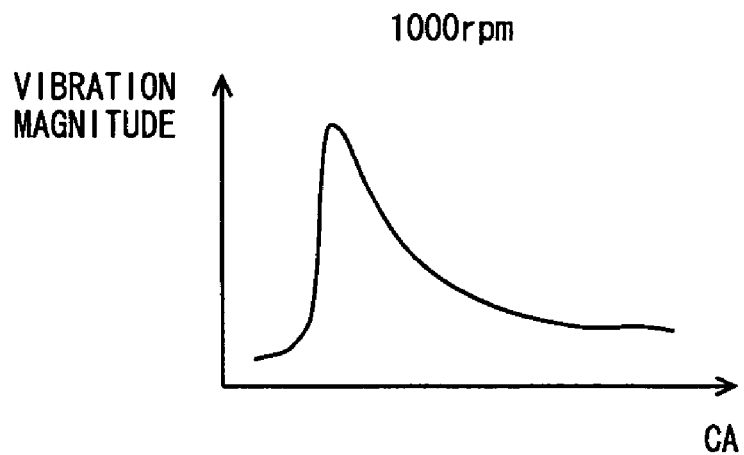
FIGS. 7A to 7C show vibration waveforms at different engine speed.
Figure 7B:
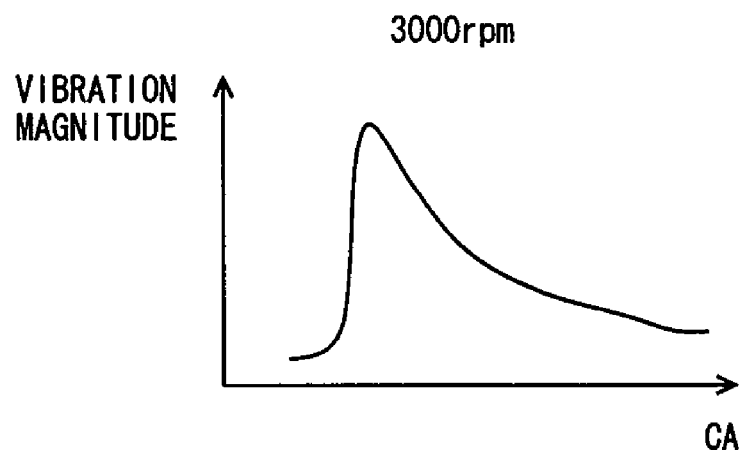
Figure 7C:
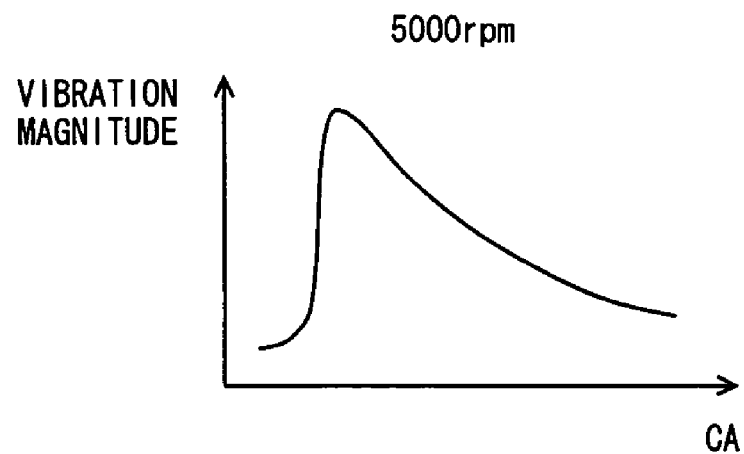

It is noted that, in the present embodiment, the knock waveform model includes a plurality of knock waveform models corresponding to states of operation of engine 100. As shown in FIGS. 7A to 7C, vibration waveforms corresponding to knocking show different tendencies dependent on the number of rotation of crank shaft 110 of engine 100. Particularly, the attenuating portion of the waveforms shown in FIGS. 7A to 7C comes to be more moderate as the number of rotation becomes higher. Attenuation after the peak value of vibration corresponding to knocking has a component that depends on the crank angle and a component that depends on the real time. Therefore, when the crank shaft 110 rotates at high speed (with the number of rotation being high), the influence of the component dependent on the real time relatively increases and the influence of component dependent on the crank angle decreases, whereby the attenuation of waveform tends to be more moderate.

Figure 8:
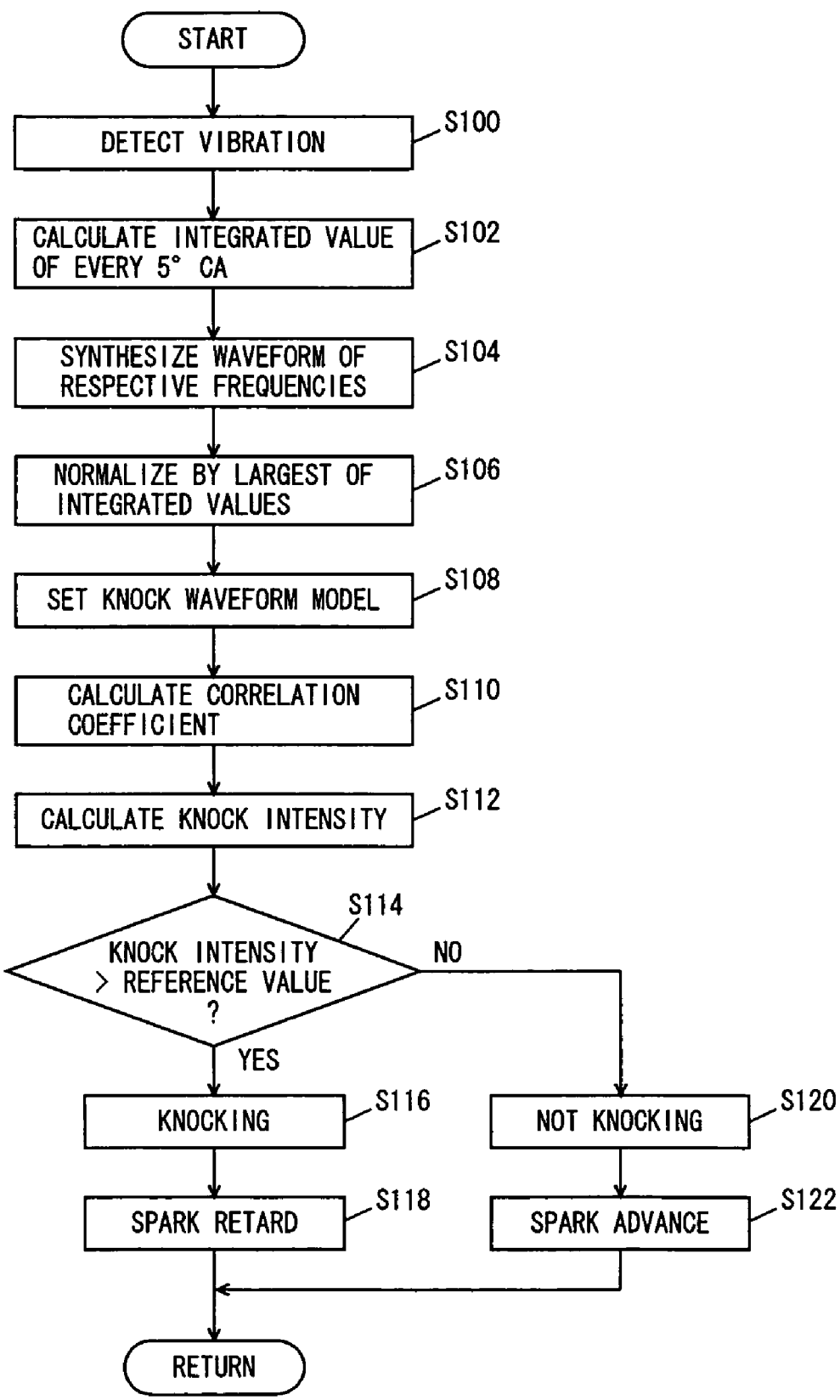
FIG. 8 is a flowchart illustrating a control structure of a program executed by the engine ECU.

Referring to FIG. 8, the control structure of the program executed by engine ECU 200 in the knocking determination device in accordance with the present embodiment will be described.

At step (hereinafter simply referred to as "S") 100, engine ECU 200 detects the vibration magnitude of engine 100 from a signal transmitted from knock sensor 300. The vibration magnitude is represented by a value of voltage output from knock sensor 300. Note that the vibration magnitude may be represented by a value corresponding to the value of the voltage output from knock sensor 300. The vibration magnitude is detected in a combustion stroke for an angle from a top dead center to (a crank angle of) 90°.

At S102, engine ECU 200 calculates for a crank angle of every five degrees an integration (hereinafter also be referred to as an "integrated value") of values of voltage output from knock sensor 300 (i.e., representing magnitude of vibration). The integrated values are calculated for the vibration of each of the first to third frequency bands A to C.

At S104, engine ECU 200 synthesizes the vibration waveforms of respective frequency bands. Specifically, from the calculated integrated values, integrated values of vibration in the first to third frequency bands A to C are synthesized. Thus, the envelope of amplitude of the vibration waveform of engine 100 is detected.

At S106, engine ECU 200 normalizes the waveform using the largest of the integrated values of the synthesized vibration waveform. Here, normalizing a waveform means dividing each integrated value by the largest of the integrated values in the detected waveform, for example, so that the vibration magnitude is represented by a dimensionless number of 0 to 1. The divisor of each integrated value is not limited to the largest of the integrated values.

Figure 9A:
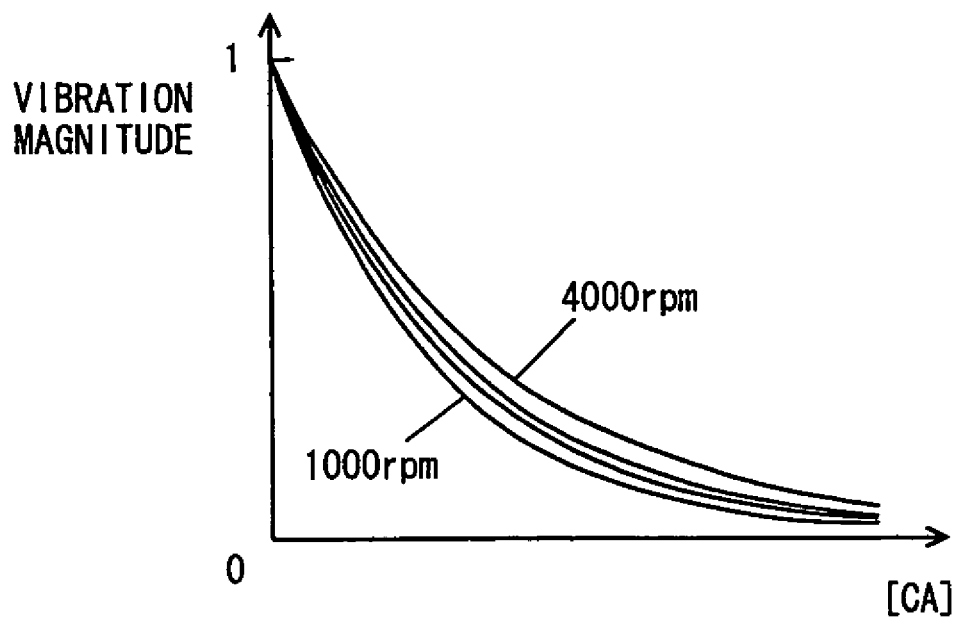
FIGS. 9A and 9B represent knock waveform models corresponding to the engine speed.

At S108, engine ECU 200 sets the knock waveform model. Specifically, engine ECU 200 senses the number of rotation of crank shaft 110 received from crank position sensor 306, and sets a knock waveform model that corresponds to the sensed number of rotation. By way of example, a map such as shown in FIG. 9A is stored beforehand in memory 202, and ECU may interpolate and calculate the knock waveform model corresponding to the sensed number of rotation from the map.

Alternatively, when the approximated waveform calculated by the predetermined attenuation factor $\lambda$ and the exponential equation as described with reference to FIG. 5 is used as the knock waveform model, the values of attenuation factor $\lambda$ corresponding to rotation numbers of every 1000 rotations may be stored as a map in memory 202 as shown in FIG. 10A, and the attenuation factor $\lambda$ corresponding to the knock waveform model matching the number of rotation of crank shaft 110 received from crank position sensor 306 may be interpolated, to set the knock waveform model. Alternatively, a map such as shown in FIG. 10B may be stored beforehand in memory 202, and the value of attenuation factor $\lambda$ corresponding to the sensed number of rotation may be calculated from the map, to set the knock waveform model, or the attenuation factor $\lambda$ may be stored as a function. Specifically, a function expression of attenuation factor $\lambda$=f1 (rotation number Ne) may be stored in advance, and the attenuation factor $\lambda$ may be calculated based on the sensed number of rotation Ne.

Further, though the value of attenuation factor $\lambda$ has been described as calculated based on the number of rotation in the present embodiment, it may be calculated not based on the number of rotation. By way of example, the waveform of vibration corresponding to knocking also tends to differ dependent on the load factor of engine 100. The load factor represents the ratio of actual intake air amount with respect to the intake air amount when engine 100 is at full load. Therefore, the load factor can be calculated based on the intake air amount sensed by an air flow meter (not shown) provided in the intake system of engine 100.

Figure 9B:
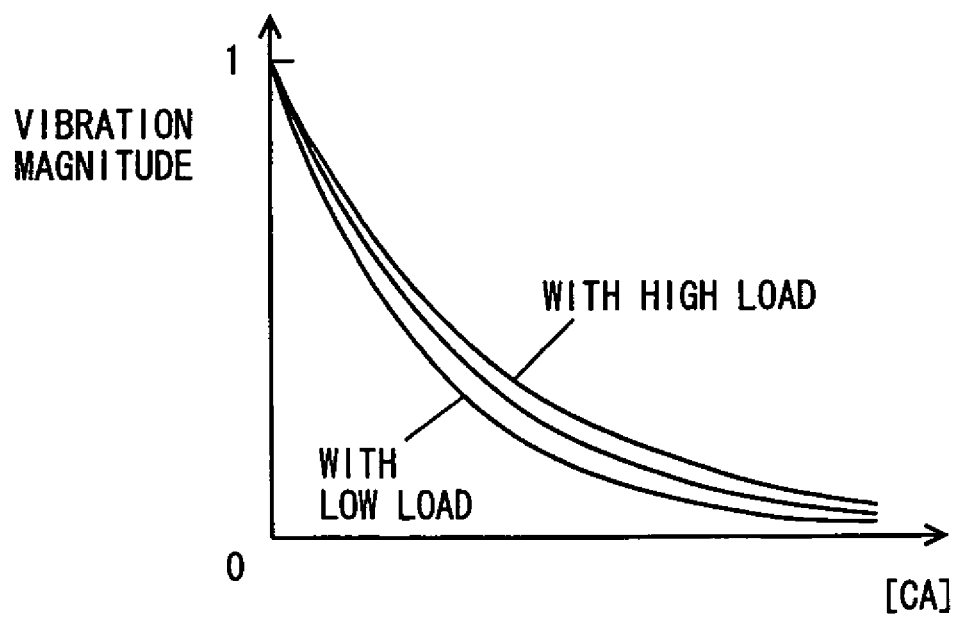

As shown in FIG. 9B, the waveform of vibration corresponding to knocking comes to have more moderate attenuation portion as the load on crank shaft 100 of engine 100 increases (load factor increases), and comes to have steeper attenuation portion as the load decreases (load factor decreases).

Therefore, a map representing the relation between the load factor KL and the attenuation factor such as shown in FIG. 9B may be stored in memory 202, and by detecting the load factor from the intake air amount of engine 100, the value of attenuation factor $\lambda$ corresponding to the sensed load factor may be calculated from the map, to set the knock waveform model.

The map is not limited to the one shown in FIG. 9B, and a map having load factor KL as the abscissa in place of number of rotation Ne such as shown in FIG. 10B may be stored. Alternatively, attenuation factor $\lambda$ may be stored as a function of load factor KL of engine 100. Specifically, the function expression of attenuation factor $\lambda$=f2 (load factor KL) may be stored beforehand, and the attenuation factor $\lambda$ may be calculated based on the sensed load factor KL.

Alternatively, attenuation factor $\lambda$ may be stored as a function of the number of rotation Ne and load factor KL of engine 100. Specifically, the function expression of attenuation factor $\lambda$=f3 (number of rotation Ne, load factor KL) may be stored beforehand, and the attenuation factor $\lambda$ may be calculated based on the sensed number of rotation NE and sensed load factor KL. A three-dimensional map (not shown) of attenuation factor $\lambda$, number of rotation Ne and load factor KL may be stored beforehand, and attenuation factor $\lambda$ may be calculated based on the sensed number of rotation NE and sensed load factor KL.

At S110, engine ECU 200 calculates a coefficient of correlation K, which is a value related to a deviation between the normalized vibration waveform and the knock waveform model. A timing of a normalized vibration waveform providing a vibration maximized in magnitude and a timing of a knock waveform model providing a vibration maximized in magnitude are matched, while a deviation in absolute value (or an amount of offset) between the normalized vibration waveform and the knock waveform model is calculated for each crank angle (of five degrees), whereby the coefficient of correlation K is obtained.

When we represent the absolute value of deviation between the normalized vibration waveform and the knock waveform model for each crank angle by $\Delta S(I)$ (wherein I is a natural number) and the vibration magnitude of knock waveform model integrated by the crank angle (i.e., the area of knock waveform model) by S, then the coefficient of correlation K is calculated by an equation K=(S−Σ$\Delta S(I)$)/S, where Σ$\Delta S(I)$ represents a sum of $\Delta S(I)$s. Note that the coefficient of correlation K may be calculated by a different method.

At S112, engine ECU 200 calculates a knock intensity N. When we represent the maximum value of calculated integrated value by P and the value representing the magnitude of vibration of engine 100 while engine 100 is not knocking by BGL (Back Ground Level), the knock intensity N is calculated by the equation N=P×K/BGL. The BGL is stored in memory 202. Note that knock intensity N may be calculated by a different method.

At S114, engine ECU 200 determines whether knock intensity N is larger than a predetermined reference value. If the knock intensity N is larger than the predetermined reference value (YES at S114), the control proceeds to S116. Otherwise (NO at S114), the control proceeds to S120.

At S116, engine ECU 200 determines that engine 100 knocks. At S118 engine ECU 200 introduces a spark retard. At S120 engine ECU 200 determines that engine 100 does not knock. At S126 engine ECU 200 introduces a spark advance.

An operation of engine ECU 200 of the knock determination device according to the present embodiment based on the above-described configuration and flowchart will be described.

When a driver turns on ignition switch 312 and engine 100 starts, vibration magnitude of engine 100 is detected from a signal transmitted from knock sensor 300 (S100).

In a combustion stroke for a range from the top dead center to 90°, an integrated value for every five degrees is calculated for respective vibrations of each of the first to the third frequency bands A to C (S102). Then, of the calculated integrated values, integrated values of vibrations in the first to third frequencies A to C are synthesized together (S104). Thus, the vibration waveform of engine 100 is detected as a synthesized wave of vibrations of the first to third frequency bands A to C.

As an integrated value for every five degrees is used to detect a vibration waveform, it becomes possible to detect a vibration waveform of which delicate variations are suppressed. Of the integrated values of vibration waveforms thus detected, the maximum integrated value is used to normalize the waveform (S106).

Here, it is assumed that each integrated value is divided by the integrated value from the angle β (1) to 5° and the vibration waveform is normalized. By the normalization, vibration magnitude in the vibration waveform is represented by a dimensionless number of 0 to 1. Thus, the detected vibration waveform can be compared with the knock waveform model regardless of the vibration magnitude. This can eliminate the necessity of storing a large number of knock waveform models corresponding to the magnitude of vibration and thus, facilitates preparation of the knock waveform model.

A knock waveform model that corresponds to the number of rotation of crank shaft 110 sensed by crank position sensor 306 is set (S108), and as shown in FIG. 11, a timing of a normalized vibration waveform providing a vibration maximized in magnitude and that of a knock waveform model providing a vibration maximized in magnitude are matched, while a deviation in absolute value ΔS(I) (hatched portion) between the normalized vibration waveform and the knock waveform model is calculated for each crank angle.

Sum ΣΔS(I) of ΔS(I) of the determination section and value S representing a magnitude of vibration in knock waveform model that is integrated by crank angle (determination section) are used to calculate the coefficient of correlation K=(S−ΣΔS(I))/S (S110). This allows numerical representation of a degree of matching between the detected vibration waveform and the knock waveform model, and hence allows objective determination.

The product of the calculated coefficient of correlation K and the largest integrated value P is divided by the BGL to calculate knock intensity N (S112). Thus, whether the vibration of engine 100 is attributed to knocking can be analyzed in greater detail, using vibration magnitude in addition to the degree of matching between the detected vibration waveform and the knock waveform model. Here, it is assumed that the product of coefficient of correlation K and the integrated value from the angle β (1) to 5° advanced therefrom is divided by BGL to calculate knock intensity N.

If knock intensity N is larger than a predetermined reference value (YES at S114) a determination is made that engine knocks (S116), and a spark retard is introduced (S118) to suppress knocking.

If knock intensity N is not larger than the predetermined reference value (NO at S114), a determination is made that the engine does not knock (S120), and a spark advance is introduced (S122).

As described above, in the knocking determination device in accordance with the present embodiment, the engine ECU detects vibration waveform of the engine based on a signal transmitted from the knock sensor, and by comparing the vibration waveform with the knock waveform model, calculates a coefficient of correlation. By way of example, a plurality of knock waveform models representing vibration waveforms when knocking occurs and corresponding to the engine speed are prepared and stored in advance, through an experiment or the like. By comparing the detected waveform with the waveform corresponding to the sensed engine speed among the stored plurality of knock waveform models, it is possible to determine whether knocking has occurred or not. Therefore, it becomes possible to provide a knocking determination device that can accurately determine whether the knocking occurs or not in the internal combustion engine, by storing the plurality of knock waveform models corresponding to the engine speed and by comparing with the detected waveform.

Further, by comparing the knock waveform model with a waveform that includes at least one of the rising portion and the attenuating portion of the vibration waveform, the shape of waveform particular to knocking can be determined with high accuracy.

Further, by comparing the knock waveform model with the waveform covering the attenuating portion of the vibration waveform including the peak value, with the angle β (1) defining the determination section set to an angle corresponding to the peak value of vibration waveform, the shape of waveform particular to knocking can be determined with high accuracy, as the waveform of the portion including the peak value has high signal output.

By storing only the characteristic portion of vibration corresponding to knocking as the knock waveform model, the amount of data to be stored beforehand can be reduced.

When the attenuation waveform after the peak value of vibration corresponding to knocking is calculated by approximation from a predetermined attenuation factor, what becomes necessary is simply to store the attenuation factor and the equation. Therefore, the amount of data to be stored beforehand can be reduced. When a plurality of attenuation factors are stored, it becomes possible to determine whether the knocking occurs or not with high accuracy, by comparing the detected waveform and the waveform derived from the attenuation factor corresponding to the state of operation of the internal combustion engine.

In the foregoing description, it is assumed that a plurality of knock waveform models are set in accordance with the state of operation of the engine. The knock waveform model, however, may be stored in a memory as one waveform that has a shape particular to knocking and that does not change regardless of the type or state of operation of the internal combustion engine. By such an approach, it becomes unnecessary to store a plurality of knock waveform models in accordance with the types and states of operation of the internal combustion engine, and therefore, the amount of data to be stored beforehand can be reduced. Further, as it is unnecessary to set the plurality of knock waveform models in accordance with the types and states of operation of the internal combustion engine, the time necessary for setting can be reduced.

Further, in the present embodiment, whether the detected waveform represents vibration corresponding to knocking or not is determined by calculating the coefficient of correlation between the knock waveform model and the shape of the detected waveform to compare the two, while such an approach is not limiting and any other method may be used provided that the similarity between the two is given in a numerical value. By way of example, a numerical value representing similarity between the knock waveform model and the detected waveform may be obtained through pattern matching, and whether the detected waveform corresponds to vibration of knocking or not may be determined. Specific method of pattern matching has been known, and therefore, detailed description will not be given here.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking determination device for an internal combustion engine, comprising:
   a crank angle detecting unit that detects a crank angle of said internal combustion engine;
   a waveform detecting unit that detects a vibration waveform of said internal combustion engine between predetermined crank angles;
   a storage unit that stores in advance a predetermined attenuation factor of a vibration waveform that corresponds to knocking, wherein the predetermined attenuation factor is a single value that corresponds to attenuation over time of the vibration waveform that corresponds to knocking, beginning after an angle that corresponds to a peak value of the vibration waveform that corresponds to knocking; and
   a determining unit that determines whether knocking occurred in said internal combustion engine or not based on a result of comparison between said detected vibration waveform and a waveform derived from said stored attenuation factor,
   wherein said determining unit normalizes said detected vibration waveform based on a value that corresponds to a peak of a magnitude of vibration of said detected vibration waveform, calculates a deviation in the magnitude of vibration of said detected vibration waveform by matching a peak timing of said normalized detected vibration waveform with a peak timing of said waveform derived from said stored attenuation factor, calculates a coefficient of correlation that relates to said deviation between said normalized detected vibration waveform and said waveform derived from said stored attenuation factor based on said calculated deviation, and determines whether knocking occurred in said internal combustion engine or not based on said calculated coefficient of correlation.

2. The knocking determination device for an internal combustion engine according to claim 1, wherein
   the waveform derived from said stored attenuation factor is a waveform of a section between a first angle and a second angle; and
   said first angle is an angle corresponding to the peak value of the vibration waveform that corresponds to knocking.

3. The knocking determination device for an internal combustion engine according to claim 2, wherein said second angle is an angle advance by a predetermined angle from said first angle.

4. The knocking determination device for an internal combustion engine according to claim 1, further comprising
   a rotation rate sensing unit that senses a rate of rotation of an output shaft of said internal combustion engine; wherein
   said storage unit stores in advance a plurality of predetermined attenuation factors of a plurality of vibration waveforms that respectively correspond to a plurality of different states of operation of said internal combustion engine;
   said plurality predetermined attenuation factors correspond to a plurality of different rates of rotation; and
   said determining unit determines whether knocking occurred in said internal combustion engine or not based on a result of comparison between said detected vibration waveform and a waveform derived from one of said plurality of predetermined attenuation factors stored in advance in said storage unit that corresponds to said sensed rate of rotation.

5. The knocking determination device for an internal combustion engine according to claim 1, further comprising
   a load factor sensing unit that senses a load factor of said internal combustion engine; wherein
   said storage unit stores in advance a plurality of predetermined attenuation factors of a plurality of vibration waveforms that respectively correspond to a plurality of different states of operation of said internal combustion engine;
   said plurality of attenuation factors stored in advance in said storage unit correspond to a plurality of different load factors; and
   said determining unit determines whether knocking occurred in said internal combustion engine or not based on a result of comparison between said detected vibration waveform and a waveform derived from one of said plurality of predetermined attenuation factors stored in advance in said storage unit that corresponds to said sensed load factor.

6. The knocking determination device for an internal combustion engine according to claim 1, further comprising
   a rotation rate sensing unit that senses a rate of rotation of an output shaft of said internal combustion engine; and
   a load factor sensing unit that senses a load factor of said internal combustion engine; wherein
   said storage unit stores in advance a plurality of predetermined attenuation factors of a plurality of vibration waveforms that respectively correspond to a plurality of different states of operation of said internal combustion engine;
   said plurality of predetermined attenuation factors stored in advance in said storage unit correspond to a plurality of different rates of rotation and a plurality of different load factors; and
   said determining unit determines whether knocking occurred in said internal combustion engine or not based on a result of comparison between said detected vibration waveform and a waveform derived from one of said plurality of predetermined attenuation factors stored in advance in said storage unit that corresponds to said sensed rate of rotation and said sensed load factor.

7. A knocking determination device for an internal combustion engine, comprising:
   crank angle detecting means for detecting a crank angle of said internal combustion engine;
   waveform detecting means for detecting a vibration waveform of said internal combustion engine between predetermined crank angles;
   storage means for storing in advance a predetermined attenuation factor of a vibration waveform that corresponds to knocking, wherein the predetermined attenuation factor is a single value that corresponds to attenuation over time of the vibration waveform that corresponds to knocking, beginning after an angle that corresponds to a peak value of the vibration waveform that corresponds to knocking; and
   determining means for determining whether knocking occurred in said internal combustion engine or not based on a result of comparison between said detected vibration waveform and a waveform derived from said stored attenuation factor,
   wherein said determining means normalizes said detected vibration waveform based on a value that corresponds to a peak of a magnitude of vibration of said detected vibration waveform, calculates a deviation in the magnitude of vibration of said detected vibration waveform by matching a peak timing of said normalized detected vibration waveform with a peak timing of said waveform derived from said stored attenuation factor, calculates a coefficient of correlation that relates to said deviation between said normalized detected vibration waveform and said waveform derived from said stored attenuation factor based on said calculated deviation, and determines whether knocking occurred in said internal combustion engine or not based on said calculated coefficient of correlation.

8. The knocking determination device for an internal combustion engine according to claim 7, wherein
the waveform derived from said stored attenuation factor is a waveform of a section between a first angle and a second angle; and
said first angle is an angle corresponding to the peak value of the vibration waveform that corresponds to knocking.

9. The knocking determination device for an internal combustion engine according to claim 8, wherein said second angle is an angle advance by a predetermined angle from said first angle.

10. The knocking determination device for an internal combustion engine according to claim 7, further comprising
rotation rate sensing means for sensing a rate of rotation of an output shaft of said internal combustion engine; wherein
said storage means stores in advance a plurality of predetermined attenuation factors of a plurality of vibration waveforms that respectively correspond to a plurality of different states of operation of said internal combustion engine;
said plurality predetermined attenuation factors correspond to a plurality of different rates of rotation; and
said determining means includes means for determining whether knocking occurred in said internal combustion engine or not based on a result of comparison between said detected vibration waveform and a waveform derived from one of said plurality of predetermined attenuation factors stored in advance in said storage means that corresponds to said sensed rate of rotation.

11. The knocking determination device for an internal combustion engine according to claim 7, further comprising
load factor sensing means for sensing a load factor of said internal combustion engine; wherein
said storage means stores in advance a plurality of predetermined attenuation factors of a plurality of vibration waveforms that respectively correspond to a plurality of different states of operation of said internal combustion engine;
said plurality of attenuation factors stored in advance in said storage means correspond to a plurality of different load factors; and
said determining means includes means for determining whether knocking occurred in said internal combustion engine or not based on a result of comparison between said detected vibration waveform and a waveform derived from one of said plurality of predetermined attenuation factors stored in advance in said storage means that corresponds to said sensed load factor.

12. The knocking determination device for an internal combustion engine according to claim 7, further comprising
rotation rate sensing means for sensing a rate of rotation of an output shaft of said internal combustion engine; and
load factor sensing means for sensing a load factor of said internal combustion engine; wherein
said storage means stores in advance a plurality of predetermined attenuation factors of a plurality of vibration waveforms that respectively correspond to a plurality of different states of operation of said internal combustion engine;
said plurality of predetermined attenuation factors stored in advance in said storage means correspond to a plurality of different rates of rotation and a plurality of different load factors; and
said determining means includes means for determining whether knocking occurred in said internal combustion engine or not based on a result of comparison between said detected vibration waveform and a waveform derived from one of said plurality of predetermined attenuation factors stored in advance in said storage means that corresponds to said sensed rate of rotation and said sensed load factor.

* * * * *